May 17, 1949. M. G. VON UFFEL 2,470,273
COMBINED STEERING WHEEL AND BRAKING MECHANISM
Filed Aug. 8, 1947
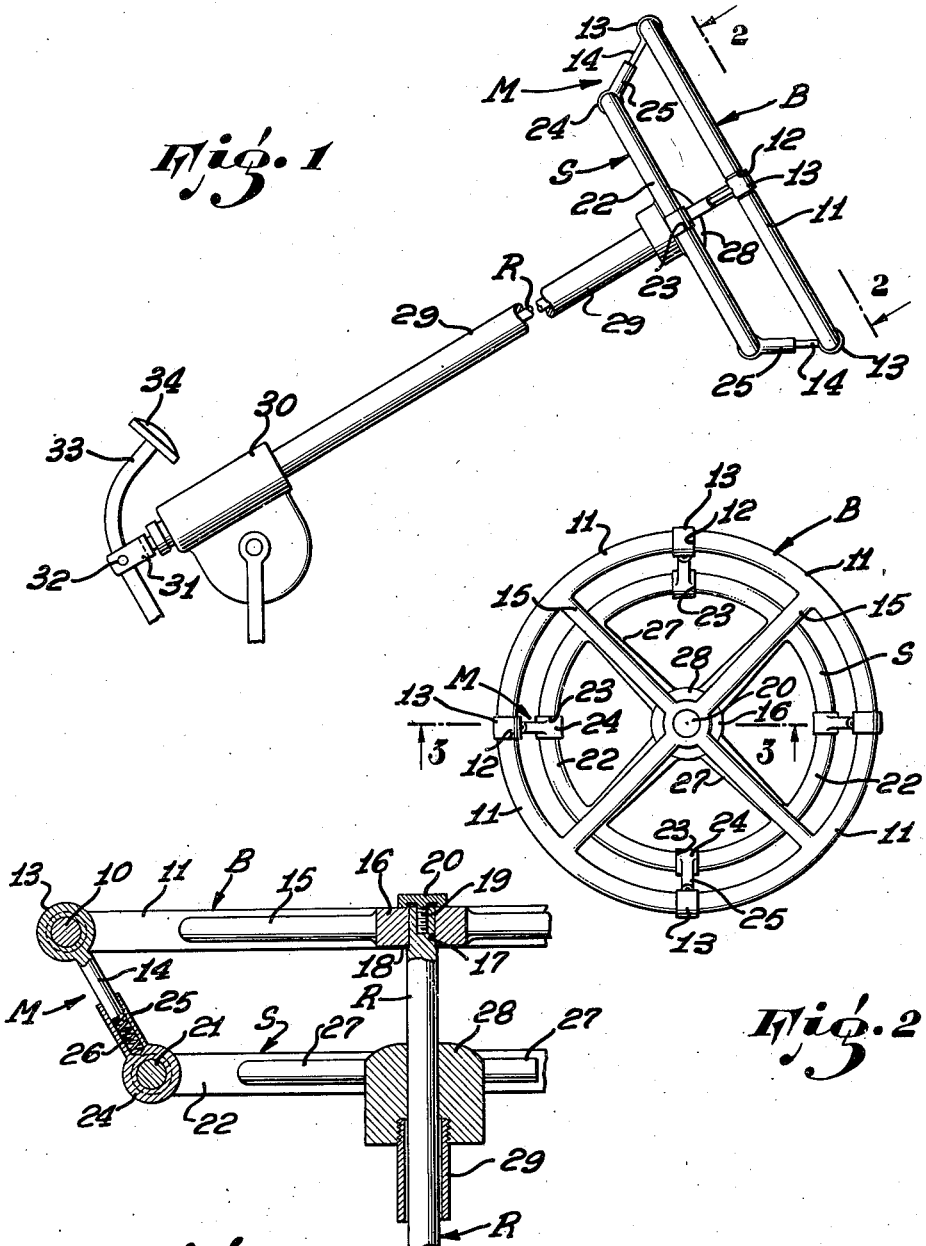
INVENTOR.
Murray G. von Uffel,
By
ATTORNEY.

Patented May 17, 1949

2,470,273

UNITED STATES PATENT OFFICE 2,470,273

COMBINED STEERING WHEEL AND BRAKING MECHANISM

Murray G. von Uffel, West Los Angeles, Calif.

Application August 8, 1947, Serial No. 767,590

2 Claims. (Cl. 74—486)

My invention relates to the field of control mechanism for a power vehicle, and more particularly to a combined steering and braking mechanism.

Although new passenger automobiles are each year provided with advanced engineering improvements to facilitate the ease of driving the vehicle, as well as to protect the safety of the occupants thereof, the number of traffic accidents throughout the nation continues to increase. It will be apparent that the solution of the traffic problem is dependent not only upon vehicles being equipped with the proper safety devices, but with these devices being so positioned that they can be utilized in the shortest possible time after a danger has been perceived. Thus when the knowledge of the engineer to provide safe automotive equipment and that of the psychologist to place the controls of such equipment in the most advantageous position are combined, a downward slope in the curve of traffic accidents can be reasonably anticipated.

In the field of psychology, it has long been known that the hand is quicker than the foot in reaction time by from 16 to 60 milliseconds (Slattery, 1893; Cattell and Dolley, 1895; Kietow, 1903). Thus in driving a power vehicle the reaction time of the hand plus 16 to 60 milliseconds elapses after a danger has been perceived by the driver before he starts to move his foot from the accelerator to the brake, and on an average another three-quarters of a second in completing this movement. While at first glance, three-quarters of a second plus 16 to 60 thousandths of a second appears to represent an insignificant total amount of time, it takes on additional importance when it is realized that this time lag in applying the brakes of a vehicle after a danger has been perceived is responsible for the vehicle traveling a considerable distance. For instance, a vehicle moving at the rate of forty-five miles an hour will travel from fifty to fifty-two feet during this time lag of three-quarters of a second plus 16 to 60 thousandths of a second, before the brakes are applied. In addition, the vehicle will on an average travel one hundred and fifty feet before the brakes which have been applied can bring it to a stop, with the result that the stopping distance of an automobile traveling at the rate of forty-five miles an hour is over two hundred feet. It has been determined from the investigations of numerous accidents that had one of the vehicles involved been able to stop within a few feet of what it was actually able to do, the accident could have been avoided. I have made such a stoppage possible by the use of my combined steering and braking mechanism that takes advantage of the faster reaction time of the hand over the foot after a danger has been perceived. By the use of the hands for braking purposes, the former time consuming factor of distance between the brake and the foot is eliminated.

In preparing to carry out an overt act, such as applying the brakes of an automobile, a person builds up a certain amount of muscular tension. It has been psychologically established that such preparatory muscular tension should be in the direction of the anticipated muscular movement in order that the impending movement can have what Woodworth, in his book "Experimental Psychology," calls a "flying start," a shortening of the time lag between the stimulus and response. However, the exact opposite of the optimum conditions for a minimum reaction time between stimulus and response are present in the conventional automobile where not only is the braking of the vehicle accomplished by the foot, but in such a manner that the foot is required to go through a complicated motion in which it is raised from the accelerator to be applied in an opposite direction to the brake pedal.

It is therefore to capitalize on the shorter reaction time of the hand over the foot, and to eliminate the complicated time-consuming movement now used in braking a vehicle, that I have devised my combined steering wheel and braking mechanism.

A major object of my invention is to supply a combined steering wheel and braking mechanism that will take advantage of the shorter reaction time of the hand over the foot, that will permit the brake of a vehicle to be applied with a simple immediate motion not involving any reaching, that will have a simple mechanical structure, be inexpensive to manufacture, easy to maintain, and which will result in the elimination of a large percentage of the present traffic accidents.

These and other objects and advantages of my invention will become apparent from the following description of a preferred form thereof, and from the drawing illustrating that form in which:

Fig. 1 is a side elevational view of my combined steering wheel and braking mechanism;

Fig. 2 is a plan view of the device taken on the line 2—2 of Fig. 1; and

Fig. 3 is a fragmentary vertical cross-sectional view of the steering and braking wheel assembly taken on the line 3—3 of Fig. 2.

Referring now to Fig. 1 for the general arrangement of my invention, it will be seen that a braking wheel B and steering wheel S are held together as an integral rotational unit by a number of vertically movable members M, and that by downward movement of the braking wheel B a brake actuating rod R can be placed in the desired braking position.

The braking wheel B, as can best be seen in Figs. 1 and 3, is fabricated from a circular core 10 of a rigid metallic material that extends through each of four annular segmental hand grips 11 that are separated from one another at each end thereof by a space 12. A collar 13 having an outer surface which conforms with the external contour of the hand grips 11 is provided for each of the spaces 12, and is rotatably mounted on the core 10. In order that the collars 13 will be freely rotatable, I have found it desirable to form that portion of the core 10 at each of the spaces 12 as a straight section, with the abutting ends of the hand grips 11 serving to maintain the collars in place thereon. It will be noted that each of the collars 13 is provided with a downwardly extending shank 14, the purpose of which will hereinafter be explained. The braking wheel B is furnished with four spoke members 15, each of which extends inwardly from one of the hand grips 11 and terminates at a centrally disposed hub 16.

In Fig. 3, it will be seen that the hub 16 is rotatably mounted on the upper end 17 of rod R that is of smaller diameter than the balance of the rod R, and forms an annular body shoulder 18 at the junction therewith. The shoulder 18 serves as a support for the hub 16, and prevents any downward movement of the wheel B with relation to the rod R. A screw 19 engages a tapped opening provided in the upper end of rod R, with the screw being furnished with a flat decorative head 20 which movably contacts the upper surface of the hub 16. Thus it will be seen that while the braking wheel B can rotate on the rod section 17, it is prevented from moving upwardly or downwardly with relation thereto by the head 20 and shoulder 18 respectively.

The steering wheel S is fabricated in much the same manner as the braking wheel B, and includes an annular core 21 of rigid material upon which four circular segmental hand grips 22 are supported, with the hand grips being separated from one another at each end thereof by a space 23. From experience, I have found it convenient to fabricate the hand grips 22 from one of the numerous plastic materials available for this purpose. A collar 24 is situated in each of the spaces 23, and is rotatably mounted on the core 21, as can best be seen in Fig. 3. Extending upwardly from each of the collars 24 is a tubular member 25 in which the lower portion of one of the shanks 14 is slidably mounted. A helical spring 26 is located within the confines of each of the tubular members 25, with its upper end in contact with the base of the shank 14. The springs 26 are at all times in compression as can best be seen in Fig. 3, and at all times tend to to move the braking wheel B upwardly.

The steering wheel S, like the braking wheel B, is provided with four inwardly extending spoke members 27 that terminate at a centrally disposed hub 28, the lower face of which is rigidly affixed to the upper end of a rigid tube 29. It will be noted that the tube 29 not only slidably supports the rod R, but extends downwardly to a conventional automobile steering box 30 that it rotatably operates. The lower end of the rod R extends through and is slidably mounted in the steering box 30, and is provided on its downward end with a yoke 31. A pin 32 is transversely mounted between the arms of the yoke 31, and is movably connected to a foot operated brake actuating lever 33 that is provided as standard equipment on the conventional automobile. However in some makes of automobiles, I have found that due to the arrangement of the mechanical equipment, a direct connection between the pin 32 and the lever 33 is not possible, but that this connection must be effected by the use of a linkage system of conventional design. It will be apparent that with my hand operated steering and braking mechanism installed in a vehicle that the lever 33 need no longer be provided with a foot operating pedal 34, and that this latter member may be removed from the lever if so desired.

A power vehicle equipped with my combined steering and braking mechanism can be operated in an extremely simple manner. It will be apparent from Fig. 2 that the vehicle can be guided by the use of either the braking wheel B or the steering wheel S as they are held together as an integral unit by the shanks 14 and the tubular members 25 slidably engaging one another. Upon a danger being perceived, or upon desiring to stop, the braking wheel B is moved downwardly by the driver applying pressure thereto at any part which his hands or hand may be grasping at the moment when braking is required; the driver being enabled invariably to begin the actual application of simple downward pressure to the braking mechanism in the shortest conceivable time that the individual driver's time of reaction will permit. As the downward movement of the wheel B takes place, the springs 26 are further compressed, and the rod R is moved downwardly to actuate the brake lever 33. When the vehicle has been brought to a stop or slowed down sufficiently, the pressure on the wheel B is released with the result that the springs 26 expand and return the wheel B to its initial non-braking position shown in Figs. 1 and 3. By the use of four of the members M, pressure can be applied to any portion of the wheel B without it having a tendency to stick or bind in its downward movement.

While the particular apparatus herein shown and described in detail is fully capable of attaining the objects and providing the advantages hereinbefore stated, it is to be understood that it is merely illustrative of the presently preferred form of my invention, and that I do not mean to limit myself to the details of construction or design herein shown other than as defined in the appended claims.

I claim:

1. A combined hand operated steering and braking mechanism for a vehicle which includes: a hand operated steering wheel which includes an annular core with a plurality of spaced hand grips provided thereon; a plurality of collars with each of said collars situated in one of said spaces and rotatably mounted on said core; a plurality of tubular members with each of said members supported from one of said collars; a plurality of springs with each of said springs positioned within the confines of one of said tubular members; a hand operated braking wheel which includes an annular core with a plurality of spaced hand grips provided thereon; a plurality of collars with each of said collars situated in one of said spaces and rotatably mounted on said braking wheel core; a plurality of rigid members with each of said members mounted on one of said braking wheel collars and slidably engaging one of said tubular members whereby said springs maintain said braking wheel in an elevated position with relation to said steering wheel; and a rod member affixed to said braking wheel and adapted to actuate the brakes of said vehicle when said braking wheel is moved downwardly by the hands, with said braking wheel and said rod being returned to the elevated non-braking position by the expansion of said springs when the pressure of the hands is removed from said braking wheel.

2. A combined steering and braking mechanism for a vehicle which includes: a hand operated steering wheel which includes an annular core with a plurality of spaced hand grips provided thereon; a plurality of collars, with each of said collars situated between adjoining ends of said hand grips and rotatably mounted on said core; a plurality of tubular members, with each of said members supported from one of said collars; a plurality of springs, with each of said springs positioned within the confines of one of said tubular members; a plurality of spokes, with each of said spokes extending inwardly from one of said hand grips; a centrally disposed hub, with the inner end of each of said spokes affixed thereto; a hollow member affixed to the lower face of said hub and adapted to guide said vehicle when revolved; a brake actuating rod slidably mounted inside said hollow member; a hub rotatably mounted on the upper end of said rod; a plurality of spokes affixed to said second hub; an annular core supported from said spokes, with said core being provided with a plurality of spaced hand grips for operating said brake actuating rod by hand; a plurality of collars, with each of said collars being situated between the adjoining ends of said hand grips and rotatably mounted on said brake actuating core; a plurality of rigid members, with each of said members being mounted on one of said braking collars and slidably engaging one of said tubular members whereby said springs maintain said core with braking hand grips in a non-braking position except when pressure is applied by hand thereto which causes said springs to be compressed further and said brake actuating rod moved to a braking position.

MURRAY G. von UFFEL.

REFERENCES CITED

The following references are of record in the file of this patent:

UNITED STATES PATENTS

| Number | Name | Date |
| --- | --- | --- |
| 1,583,642 | Bailey | May 4, 1926 |
| 1,841,294 | Nicholson | Jan. 12, 1932 |
| 1,960,665 | Hudson | May 29, 1934 |
| 2,197,671 | Vergana | Apr. 16, 1940 |
| 2,232,529 | Holk | Feb. 18, 1941 |
| 2,430,789 | Stone | Nov. 11, 1947 |